US011218060B2

(12) United States Patent
Elliott et al.

(10) Patent No.: US 11,218,060 B2
(45) Date of Patent: Jan. 4, 2022

(54) MANUAL WIRE FORMING PRESS FOR BAR WOUND ELECTRIC MOTOR ASSEMBLY

(71) Applicant: GM Global Technology Operations LLC, Detroit, MI (US)

(72) Inventors: Jacob Elliott, Novi, MI (US); John D. Campbell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 16/676,868

(22) Filed: Nov. 7, 2019

(65) Prior Publication Data

US 2021/0143713 A1 May 13, 2021

(51) Int. Cl.
*H02K 15/04* (2006.01)
*B21F 1/00* (2006.01)

(52) U.S. Cl.
CPC ......... *H02K 15/0421* (2013.01); *B21F 1/004* (2013.01)

(58) Field of Classification Search
CPC ......... B21F 1/00; B21F 1/04; H02K 15/0025; H02K 15/0031; H02K 15/0043; H02K 15/04; B21D 7/06; B21D 37/10; B30B 1/02; B30B 1/04; B30B 1/06; B30B 1/26; B30B 1/261; B30B 1/263; B30B 1/265; B30B 1/266; B30B 1/268
USPC ........... 72/372, 373, 374, 376, 390.3, 390.5, 72/452.1
See application file for complete search history.

(56) References Cited

U.S. PATENT DOCUMENTS

| 1,700,966 | A | * | 2/1929 | Baerbalck | ............... | B30B 1/263 74/45 |
| 2,633,094 | A | * | 3/1953 | Muller | .................... | B30B 1/268 72/429 |
| 2002/0015752 | A1 | * | 2/2002 | Kamohara | .............. | B29C 33/30 425/406 |
| 2005/0040775 | A1 | * | 2/2005 | Nagae | ....................... | H02P 1/00 318/9 |
| 2019/0190359 | A1 | * | 6/2019 | Miyawaki | ............ | H02K 15/067 74/45 |

FOREIGN PATENT DOCUMENTS

| CN | 110026495 A | * | 7/2019 | ............... B21F 1/00 |
| DE | 4430201 A1 | * | 3/1995 | ......... B30B 15/0064 |
| EP | 3360674 A1 | * | 8/2018 | ............... F16N 7/20 |
| KR | 20120069968 A | * | 6/2012 | ............. B30B 1/268 |
| WO | WO-2012020569 A1 | * | 2/2012 | ........... B21D 22/022 |

* cited by examiner

*Primary Examiner* — Adam J Eiseman
*Assistant Examiner* — Matthew Stephens
(74) *Attorney, Agent, or Firm* — Vivacqua Crane PLLC

(57) ABSTRACT

A wire forming press apparatus includes a press having a die assembly including a displaceable upper die moved with respect to a fixed lower die. A first lever arm is manually displaced to perform a first operation in a first direction on a wire blank positioned between the upper die and the lower die. A second lever arm is manually displaced to perform a second operation in a second direction opposite to the first direction on the wire blank. A first gear set is connected to and rotated by displacement of the first lever arm. A second gear set is connected to and is rotated by displacement of the second lever arm.

16 Claims, 9 Drawing Sheets

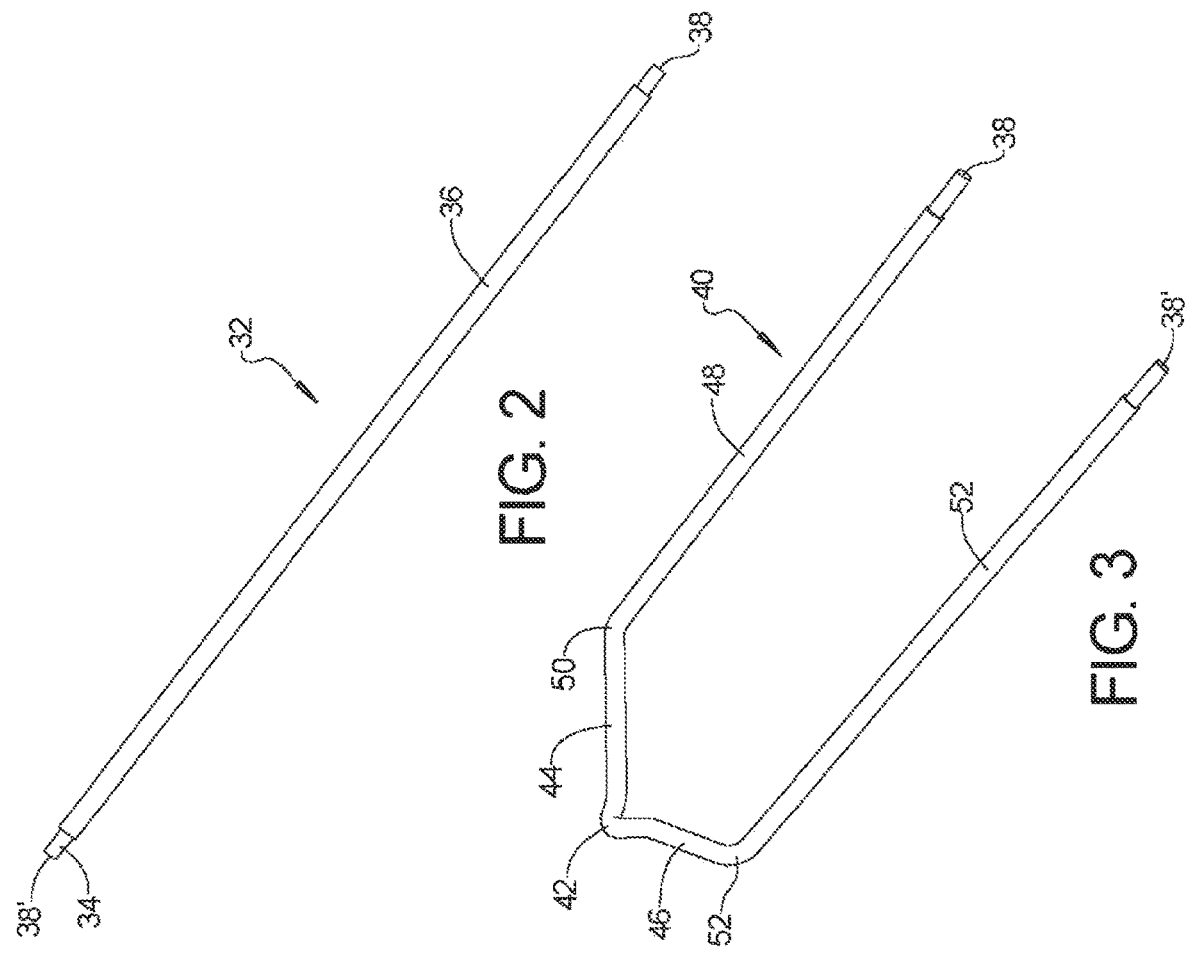
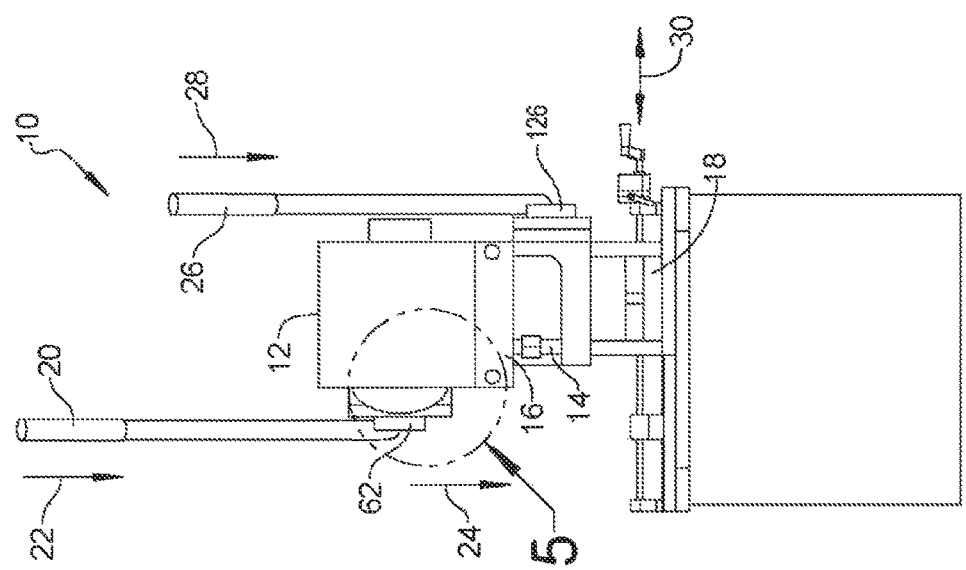

MANUAL WIRE FORMING PRESS FOR BAR WOUND ELECTRIC MOTOR ASSEMBLY

INTRODUCTION

The present disclosure relates to electrical motor design including stator winding assemblies.

A manual ZXY wire forming press is a device that is used to three-dimensionally form magnet wire in preparation for installation and assembly into a bar wound stator assembly of an electric motor. Current state of the art devices are lacking in resultant wire form quality and performance. Known devices have a high wear rate even at prototype volumes and require frequent adjustment during batch builds.

Current Wire Forming fixtures are susceptible to rapid wear they were not designed to sustained regular prototype volumes. The excessive wear results in regularly purchasing replacement details on the press to keep it operational. The new Press will be made out of thicker and more rigid details. Current state of the art techniques have high scrap rates during initial press setup due to a required "trial and error" approach to tool setup.

Thus, while current wire forming presses for bar wound electric motor assemblies achieve their intended purpose, there is a need for a new and improved system and method for forming magnet wire for installation into stator assemblies of electric motors.

SUMMARY

According to several aspects, a wire forming press apparatus includes a press having a die assembly including a displaceable first die moved with respect to a fixed second die. A first lever arm is manually displaced to perform a first operation in a first direction on a wire blank positioned between the first die and the second die. A first gear set is connected to and is rotated by displacement of the first lever arm. A cam is connected by a connecting rod follower to the first die. The first gear set is also connected to the cam to rotate the cam during displacement of the first lever arm to thereby displace the first die.

In another aspect of the present disclosure, a second lever arm manually displaced to perform a second operation in a second direction opposite to the first direction on the wire blank.

In another aspect of the present disclosure, a second gear set connected to and rotated by displacement of the second lever arm.

In another aspect of the present disclosure, a pin connects the connecting rod follower to the cam, the pin allowing the cam to axially rotate 90 degrees to a rotated position, and to axially rotate greater than 90 degrees to an over-center positive rotation stop for the cam.

In another aspect of the present disclosure, the cam includes an inner wall directly contacted by an outer wall of the connecting rod follower to provide the positive rotation stop for the cam.

In another aspect of the present disclosure, the first die is in direct contact with the second die at the rotated position of the cam having a centerline of the pin aligned with a longitudinal axis of the connecting rod follower.

In another aspect of the present disclosure, a gap between the first die and the second die is created at the over-center positive rotation stop for the cam with the first die displaced away from the second die and having a centerline of the pin angularly displaced with respect to a longitudinal axis of the connecting rod follower.

In another aspect of the present disclosure, an adjustment device positioned between the connecting rod follower and the first die allows adjustment of a position of the first die.

In another aspect of the present disclosure, a counterweight system includes a flexible belt frictionally contacting an outer surface of the cam and connected to a counterweight, the counterweight acting to lift the upper die to return the upper die after downward displacement in a first direction back to a home position.

In another aspect of the present disclosure, the gear set includes a first gear and a second gear, the first gear having a first diameter larger than a second diameter of the second gear to provide a mechanical advantage in rotating the cam.

According to several aspects, a wire forming press apparatus includes a press having a die assembly including a displaceable upper die moved with respect to a fixed lower die. A first lever arm is manually displaced to perform a first operation in a first direction on a wire blank positioned between the upper die and the lower die. A second lever arm is manually displaced to perform a second operation in a second direction opposite to the first direction on the wire blank. A first gear set is connected to and rotated by displacement of the first lever arm. A second gear set is connected to and is rotated by displacement of the second lever arm.

In another aspect of the present disclosure, a cam is connected by a connecting rod follower to the upper die.

In another aspect of the present disclosure, the first gear set is also connected to the cam to rotate the cam during displacement of the first lever arm to thereby displace the upper die.

In another aspect of the present disclosure, a lever arm shaft is positioned within a housing of the press. A first gear is provided with the first gear set. A cam shaft is connected to the cam. The first lever arm is connected to the lever arm shaft, the lever arm shaft rotating the first gear of the first gear set to rotate the cam shaft connected to the cam.

In another aspect of the present disclosure, a pin connects the connecting rod follower to the cam, the pin allowing the cam to axially rotate 90 degrees to a rotated position, and to axially rotate greater than 90 degrees to an over-center positive rotation stop for the cam wherein the cam co-rotated with the cam shaft to displace the connecting rod follower downwardly to downwardly displace the upper die toward the lower die.

In another aspect of the present disclosure, an apex is formed in the wire blank during the first operation performed in the first direction on the wire blank, the apex extending from and positioned between a first elevated shoulder and a second elevated shoulder.

In another aspect of the present disclosure, an adjustment device positioned between the connecting rod follower and the upper die allows adjustment of a position of the upper die, the adjustment device defining a micrometer.

According to several aspects, a method for forming wire from wire blanks using a wire forming press apparatus incudes: configuring a displaceable upper die with respect to a fixed lower die to form a die assembly; manually displacing a first lever arm to perform a first operation in a first direction on a wire blank positioned between the upper die and the lower die; rotating a first gear set connected to the upper die to assist displacing the first lever arm; and connecting a cam to the upper die using a connecting rod follower.

In another aspect of the present disclosure, the method further includes: axially rotating the cam greater than 90 degrees to an over-center positive rotation stop for the cam; and manually moving a second lever arm to perform a second operation in a second direction opposite to the first direction on the wire blank.

In another aspect of the present disclosure, the method further includes engaging a second gear set by movement of the second lever arm to assist displacing the second lever arm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a front elevational view of a wire forming press apparatus according to an exemplary aspect;

FIG. 2 is a top plan view of a wire blank prior to operations performed using the wire forming press apparatus of FIG. 1;

FIG. 3 is a top perspective view of a formed wire component modified from the wire blank of FIG. 3;

FIG. 9 is a front cross-sectional view similar to FIG. 8 showing a;

DETAILED DESCRIPTION

Figure 4:
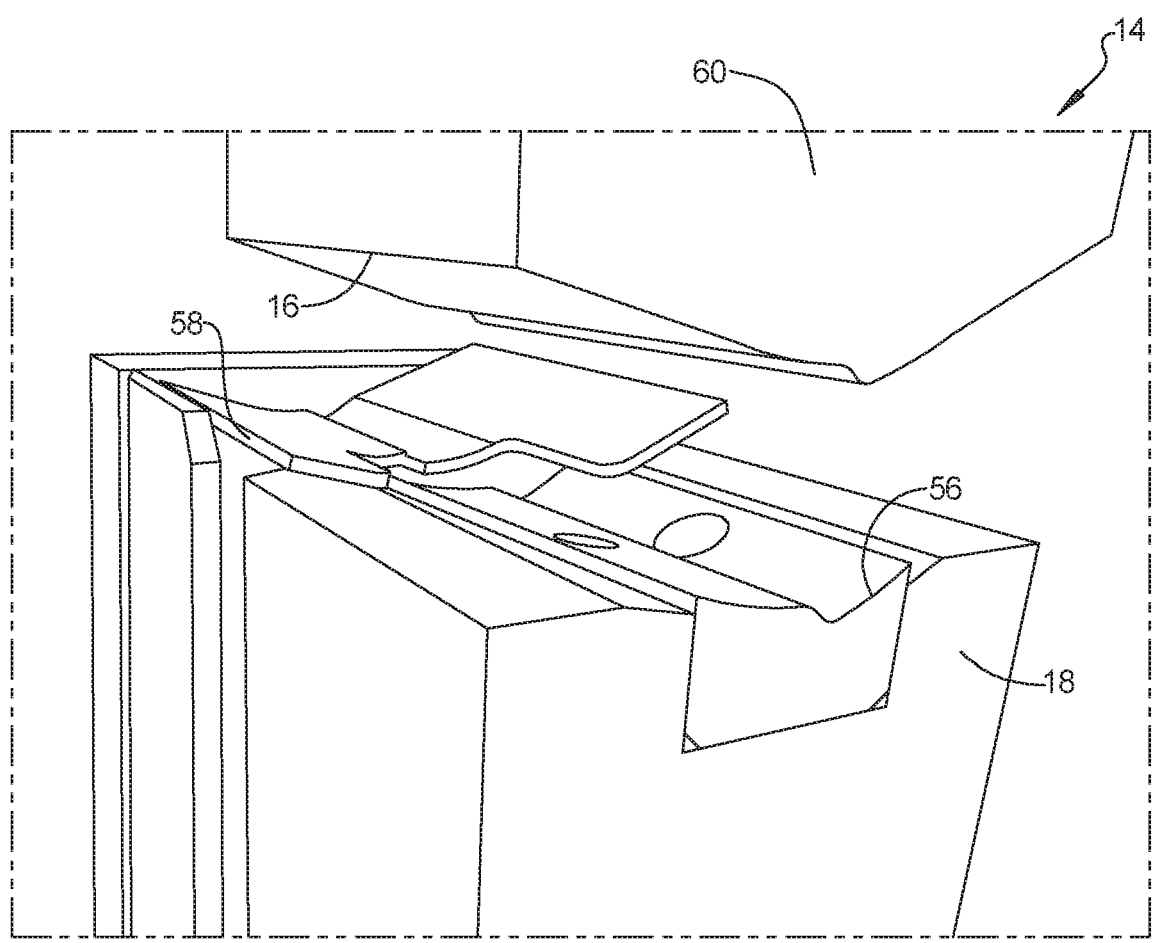
FIG. 4 is a top right perspective view of the press of FIG. 1.

The following description is merely exemplary in nature and is not intended to limit the present disclosure, application, or uses.

Referring to FIG. 1, a wire forming press apparatus 10 includes a press 12 having a die assembly 14 including a displaceable first or upper die 16 moved with respect to a fixed second or lower die 18. Features of the upper die 16 are moved into contact with the lower die 18 by sequential manual displacement of a first lever arm 20 in a downward direction 22 which performs a first operation in a first direction 24 on a wire blank shown and described in greater detail in reference to FIG. 2. The first operation is followed by a subsequent manual displacement of a second lever arm 26 in a downward direction 28 which performs a second operation in a second direction 30 opposite to the first direction 24 on the wire blank. A formed wire component shown and described in greater detail in reference to FIG. 3 is then removed from the press 12 by opposite displacement in reverse order of the second lever arm 26 followed by the first lever arm 20.

Referring to FIG. 2 and again to FIG. 1, an exemplary wire blank 32 to be formed using the press 12 is initially provided in a linear form into the die assembly 14 with the upper die 16 spaced away from the lower die 18. The wire blank 32 has a conductive core 34 for example of a copper material having an insulating covering 36 applied over the conductive core 34 extending for a portion of a length of the wire blank 32. Free ends such as a first free end 38 and a second free end 38' have a portion of the insulating covering 36 removed allowing a portion of the conductive core 34 to be freely exposed at opposite ends of the wire blank 32.

Referring to FIG. 3 and again to FIGS. 1 and 2, a formed wire component 40 is shown after removal from the press 12 of FIG. 1. The formed wire component 40 includes 3-dimensional features as follows. During initial displacement of the first lever arm 20 in the downward direction 22 the first operation is performed in the first direction 24 to create an apex 42 extending from and positioned between a first elevated shoulder 44 and a second elevated shoulder 46. The apex 42 is a three-dimensional or elevated feature defining a raised portion of the wire blank 32 in a first step to form the formed wire component 40 from the wire blank 32. The first lever arm 20 is locked in the downward displaced position as described below and by a subsequent manual displacement of the second lever arm 26 in the downward direction 28 the second operation is performed in the second direction 30 to create a first leg 48 connected to the first elevated shoulder 44 by a first bend 50, and a second leg 52 connected to the second elevated shoulder 46 by a second bend 54. According to several aspects the first leg 48 may be parallel to the second leg 52, however in other aspects the first leg 48 and the second leg 52 may be angularly oriented with respect to each other. As previously described in reference to FIG. 2 the first free end 38 and the second free end 38' have a portion of the insulating covering 36 removed defining free ends of the first leg 48 and the second leg 52.

Referring to FIG. 4 and again to FIGS. 1 through 3, the die assembly 14 is shown in an open condition. The first lever arm 20 is attached to the upper die 16 and defines part of a vertical or "Z" stroke of the upper die 16 toward the lower die 18 to form the apex 42 of the formed wire component 40. The die assembly 14 also includes a lower die insert 56 connected to the lower die 18. The lower die insert 56 assists in creating the profile of the first leg 48 and the second leg 52 in a horizontal plane. A blade 58 is attached to the second lever arm 26 to perform a horizontal or "XY" stroke. The blade 58 forces the wire blank 32 to form around the lower die insert 56 to create the profile of the first leg 48 and the second leg 52 in the horizontal plane. As the upper die 16 is initially downwardly displaced by rotation of the first lever arm 20 the upper die 16 contacts the lower die 18 forming the apex 42 and temporarily restricting movement of the wire blank 32 during subsequent motion of the second lever arm 26. As previously noted, the lower die 18 is a stationary part of the tooling assembly. The lower die 18 assists in forming the apex 42 of the formed wire component 40 together with the first leg 48 first bend 50 and the second leg 52 second bend 54. A first gear set disposed within a housing 60 of the upper die 16 provides the "Z" stroke displacement for the upper die by rotation of the first lever arm 20 as described in greater detail in reference to FIG. 6.

Referring to FIG. 5 and again to FIGS. 1 through 4, located within the housing 60 is a first mechanical assembly 62 which provides a mechanical advantage during manual rotation of the first lever arm 20. The first lever arm 20 is connected to a lever arm shaft 64 within the housing 60. The lever arm shaft 64 rotates a first spur gear shown and described in greater detail in reference to FIG. 6 which rotates a cam shaft 66. A first cam 68 connected to and co-rotated with the cam shaft 66 displaces a first connecting rod follower 70 downwardly from the position shown in FIG. 5 to downwardly displace the upper die 16. The first connecting rod follower 70 is rotatably connected to the first cam 68 using a first pin 72.

Figure 5:
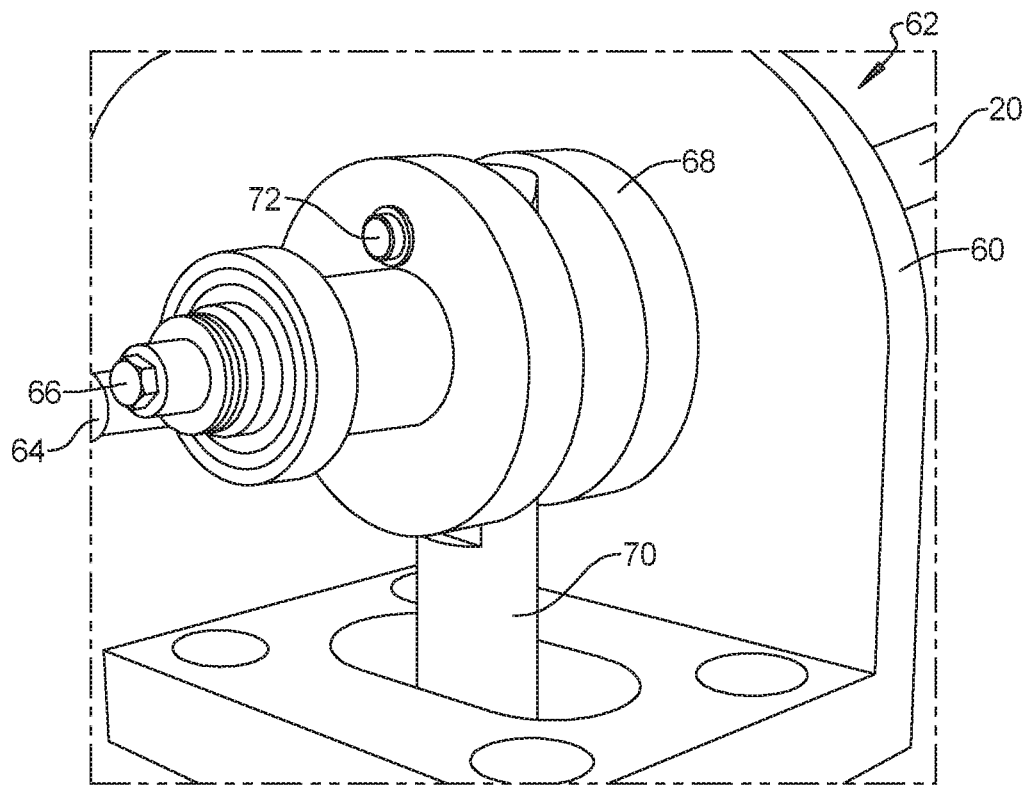
FIG. 5 is a partial cross-sectional front perspective view of area 5 of FIG. 1.

Referring to FIG. 6 and again to FIG. 5, a first gear set 73 is disposed within the housing 60 of the upper die 16 and provides the "Z" stroke displacement for the upper die 16 by manual rotation of the first lever arm 20. Manual rotation of the first lever arm 20 rotates the lever arm shaft 64 to axially rotate a first gear 74 of the first gear set 73 defining a spur gear fixed to the lever arm shaft 64. The first gear 74 engages and rotates a second gear 76 of the first gear set 73 defining a second spur gear which is fixedly mounted on the cam shaft 66 and thereby axially rotates the cam shaft 66 and the first cam 68. According to several aspects the first gear 74 has a first diameter d1 which is larger than a second diameter d2 of the second gear 76 to provide a mechanical advantage in rotating the first cam 68.

Figure 6:
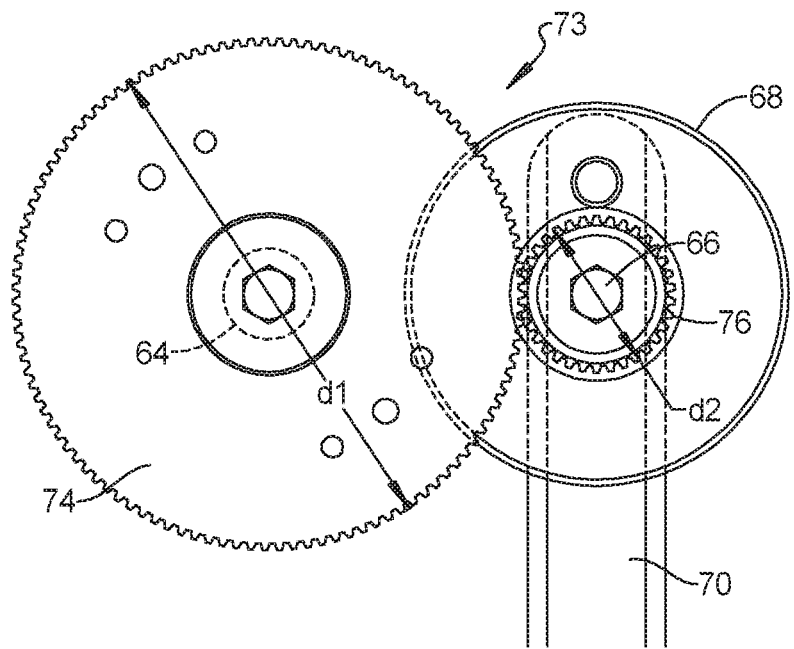
FIG. 6 is a side elevational view of further components shown in FIG. 5.

Referring to FIG. 7 and again to FIGS. 5 and 6, a first end of the first connecting rod follower 70 is positioned within a cavity 78 of the first cam 68. The first cam 68 is provided with a positive rotation stop when the first connecting rod follower 70 directly contacts an inner wall 80 of the first cam 68 better shown and described in reference to FIG. 8.

Figure 7:
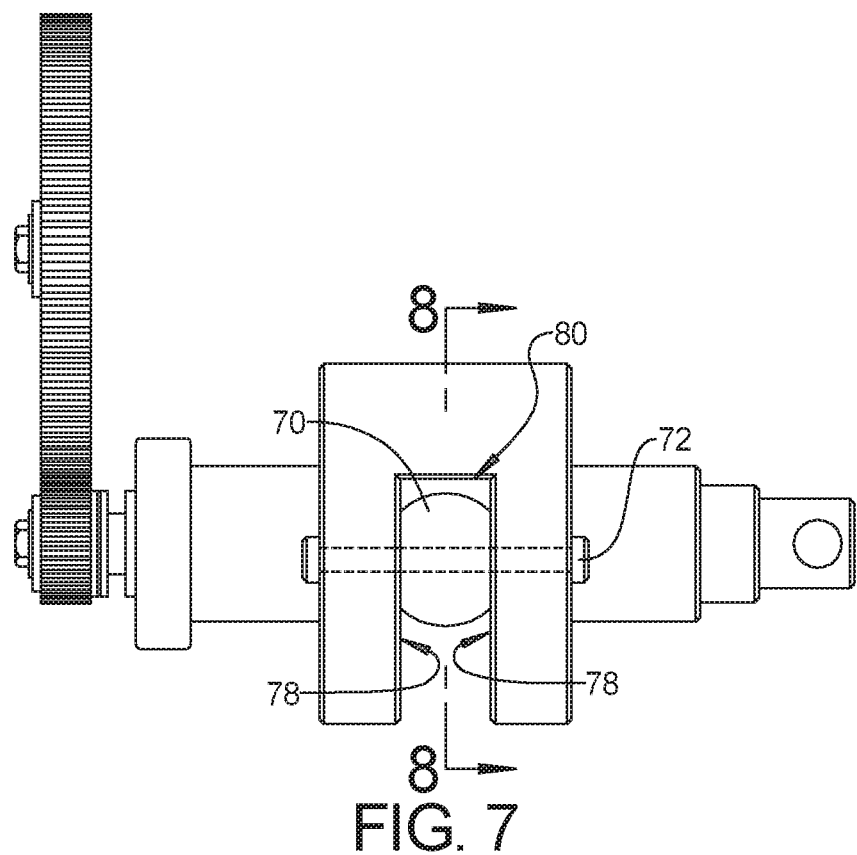
FIG. 7 is a top plan view of the components of FIG. 6.

Referring to FIG. 8 and again to FIG. 7, the inner wall 80 of the first cam 68 is directly contacted by an outer wall 82 of the first connecting rod follower 70 to provide the positive rotation stop for the first cam 68. The positive rotation stop provides a physical indication to an operator rotating the first lever arm 20 that the displaceable upper die 16 has contacted the fixed lower die 18 and performed the first operation in the first direction 24 to create the apex 42 in the wire blank 32 as described in reference to FIG. 3.

Referring to FIG. 9 and again to FIG. the upper die 16 is connected to the housing 60 using four guide-posts, only two of which are clearly visible in this view, defining a first guide post 84 and a second guide post 86. The guide-posts are connected to the upper die 16 and downwardly or upwardly displace together with the upper die 16. The guide-posts center the upper die 16 and apply an even force as the upper die 16 contacts the wire blank 32. An adjustment device 88 is positioned between the first connecting rod follower 70 and the upper die 16 allowing adjustment of a position of the upper die 16. According to several aspects the adjustment device 88 defines a micrometer. During operation the first cam 68 is initially rotated approximately 90 degrees from an initial position 90 of the first pin 72 with the first pin 72 located as shown in FIG. 5 about an arc of rotation 92 to a first cam rotated position defining a die fully extended position having a centerline of the first pin 72 aligned with a longitudinal axis 96 of the first connecting rod follower 70. This motion creates the apex 42 in the wire blank 32 as described in reference to FIG. 3.

Figure 10:
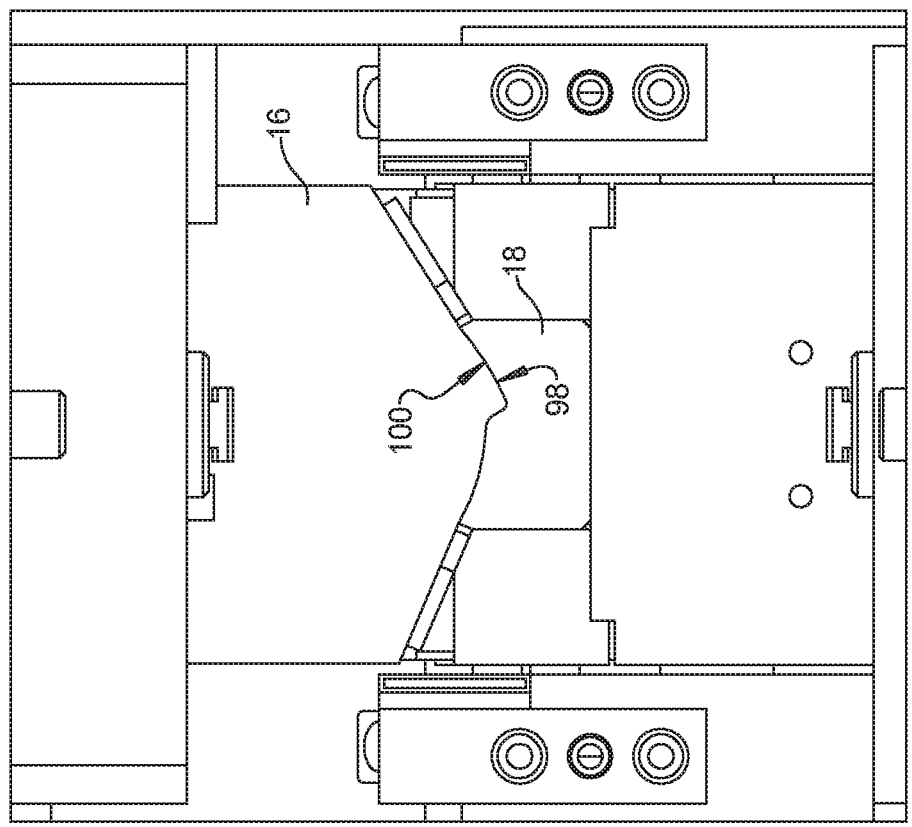
FIG. 10 is a front elevational view of a die assembly of the press of FIG. 1 in a die fully extended position having the upper die directly contacting the lower die.
Figure 9:
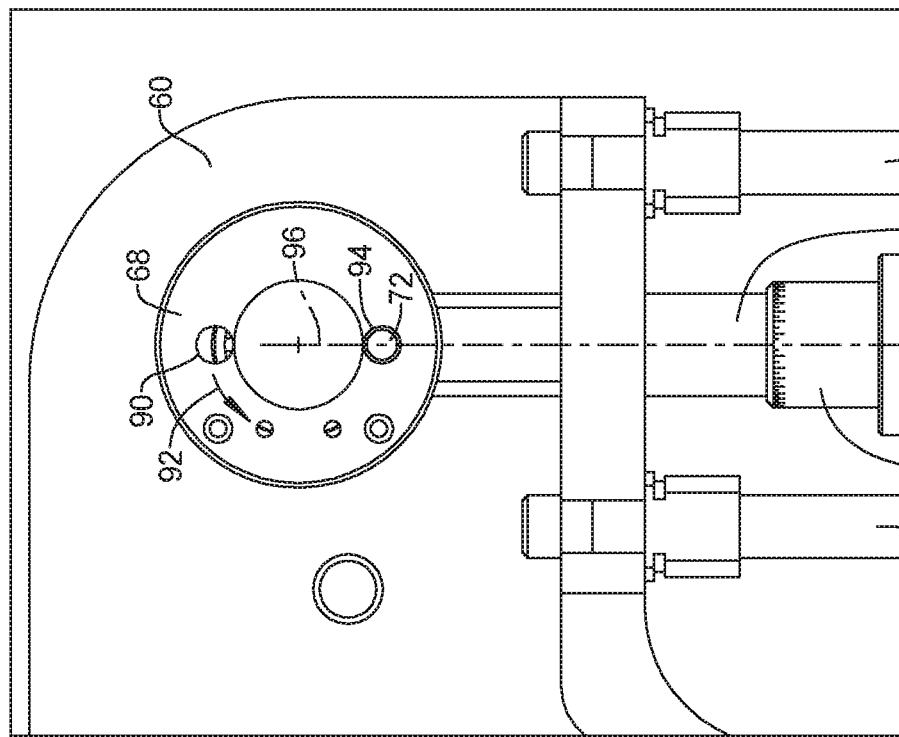

Referring to FIG. 10 and again to FIG. 9, at the die fully extended position the upper die 16 directly contacts the lower die 18. A downward directed face 98 of the upper die 16 directly contacts an upward directed face 100 of the lower die 18.

Figure 8:
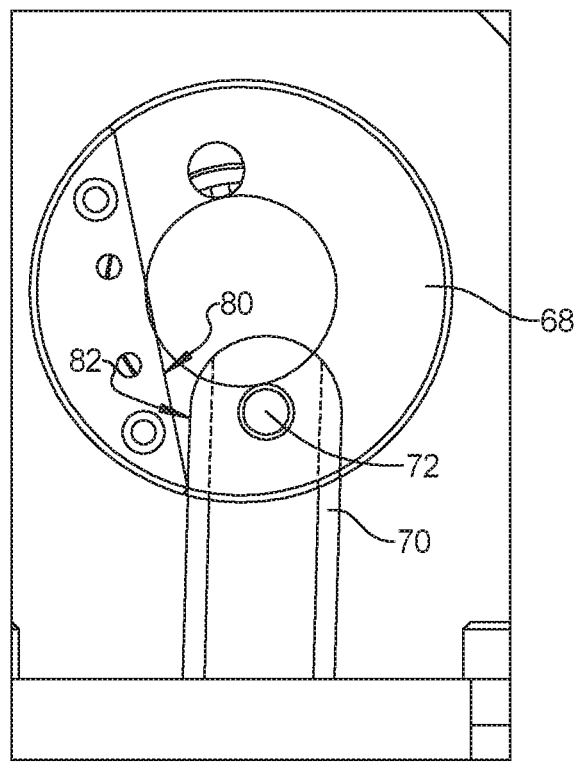
FIG. 8 is a side cross-sectional view taken at section 8 of FIG. 7.

Referring to FIG. 11 and again to FIGS. 8 and 9, when the inner wall 80 of the first cam 68 is directly contacted by the outer wall 82 of the first connecting rod follower 70 the positive rotation stop for the first cam 68 is provided. The positive rotation stop is reached when the first pin 72 is rotated in the arc of rotation 92 over-center as shown such that a centerline 102 of the first pin 72 is offset from the longitudinal axis 96 of the first connecting rod follower 70. This continued rotation of the first cam 68 lifts the upper die 16 in a vertical lift direction 104 away from contact with the lower die 18, thereby restraining the wire blank 32 to reduce force applied to the wire blank 32 during the subsequent operation of the second lever arm 26. A constant input force is therefore provided by the operator due to a "locked" final stroke position. This improves the resulting wire form repeatability. During wire processing, the operator therefore does not need to stop forming and make regular adjustments to the fixture to continue producing wire forms that meet specifications. The wire forming press apparatus 10 enables batch builds to be completed with minimal downtime due to parameter adjustments. As a result, the risk of the process drifting over time and wire form quality degrading is reduced, leading to improved long-term process capability. This will also enable reduced inspection frequency during builds.

Figure 12:
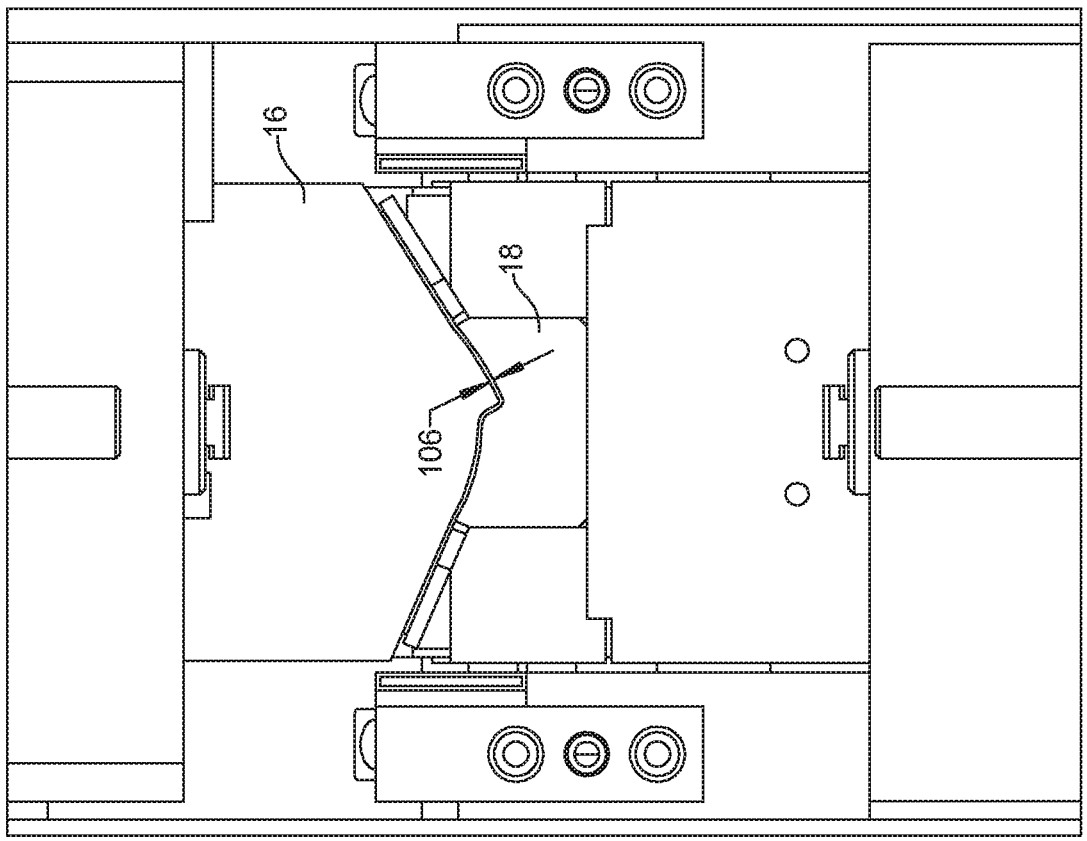
FIG. 12 is a front elevational view modified from FIG. 10 to show the die partially open position with the cam in the cam over-center rotated position.
Figure 11:
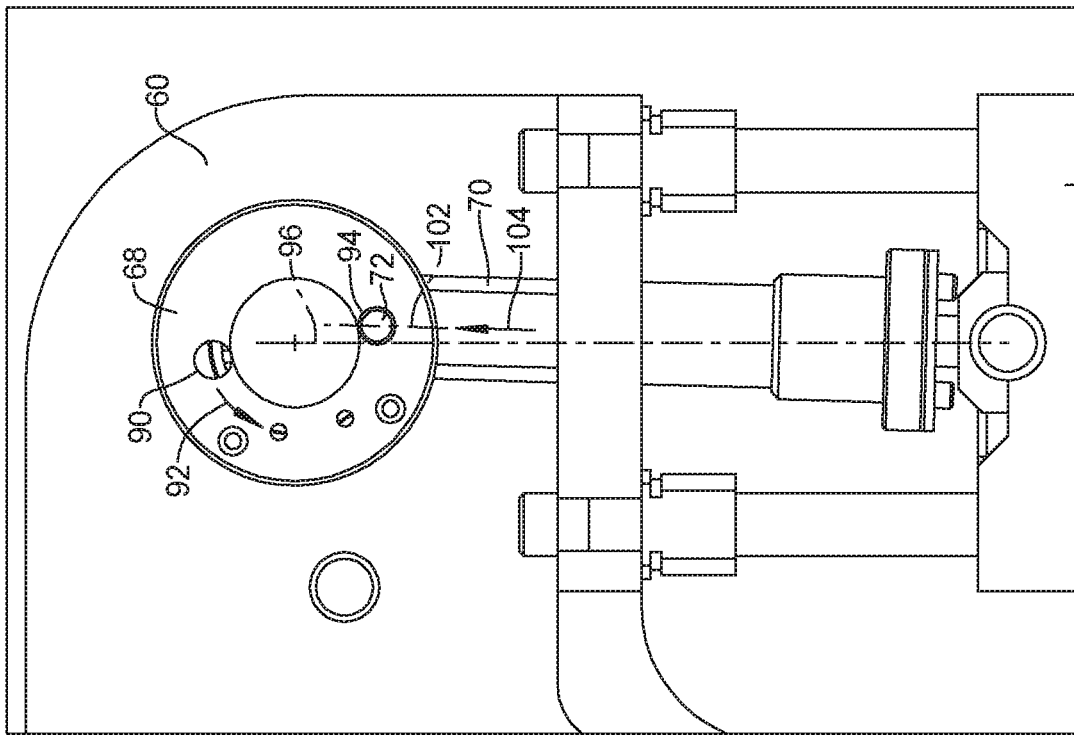
FIG. 11 is a front cross-sectional view modified from FIG. 9 to show an over-center rotated position of the cam.

Referring to FIG. 12 and again to FIG. 11, at the "locked" rotated position of the first cam 68 a gap 106 is provided between the upper die 16 and the lower die 18. The first cam 68 rotates to the over-center position shown in FIG. 11 which moves the upper die 16 upwardly away from direct contact with the lower die 18. Provision of the gap 106 continues to restrain the wire blank 32 between the upper die 16 and the lower die 18 while simultaneously reducing force applied to the wire blank 32. According to several aspects the gap 106 ranges from approximately 0.1 mm up to approximately 1.0 mm inclusive.

Referring again to FIGS. 1 and 4 through 8, as previously noted the first mechanical assembly 62 provides a mechanical advantage during manual rotation of the first lever arm 20 to perform the first operation in the first direction 24. A second mechanical assembly 126 similar to the first mechanical assembly 62 similarly provides a mechanical advantage during manual rotation of the second lever arm 26 to perform the second operation in the second direction 30. The second mechanical assembly 126 provides cam, pin, connecting rod follower and gear components similar to the first mechanical assembly 62 and oriented 90 degrees with respect to the components of the first mechanical assembly 62 to produce a horizontal motion to perform the second operation in the second direction 30.

Figure 13:
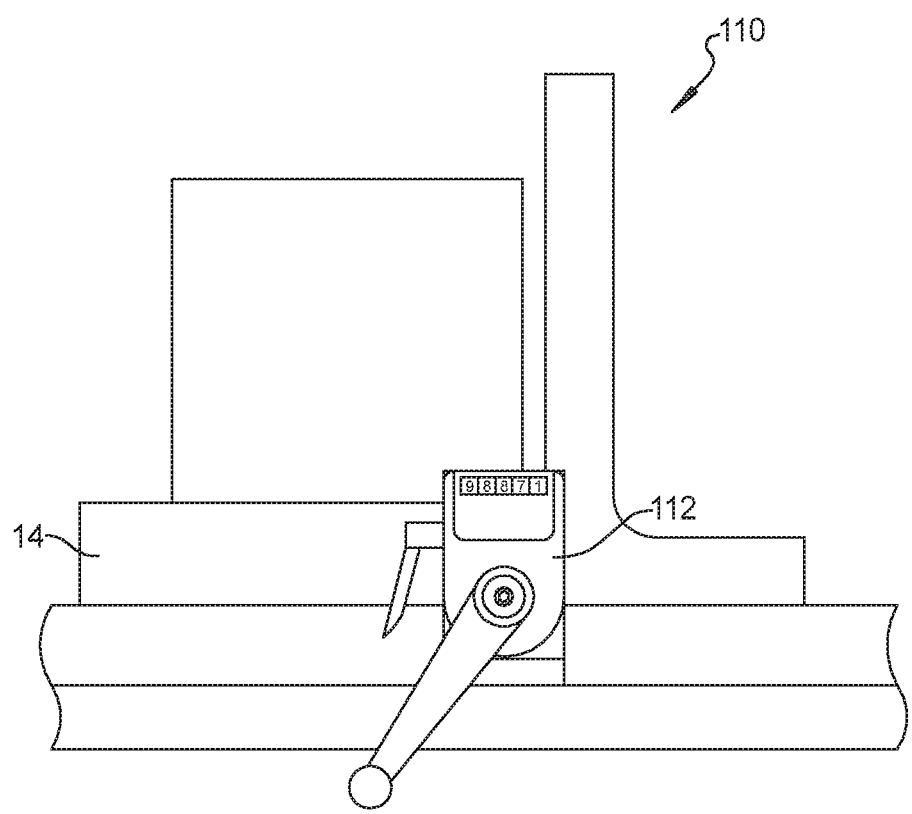
FIG. 13 is a side elevational view of the press of FIG. 1.

Referring to FIG. 13 and again to FIGS. 1 through 12, the press 12 of the wire forming press apparatus 10 may further include an adjustment system 110 having a die adjustment micrometer 112. The die adjustment micrometer can have a dial setting for identifying a repeatable setting position of the upper die 16. The die adjustment micrometer 112 provides a "cross-car hard stop" that prevents wire movement in a horizontal or left-to-right motion which controls lengths of the first leg 48 and the second leg 52 of the formed wire component 40.

Figure 14:
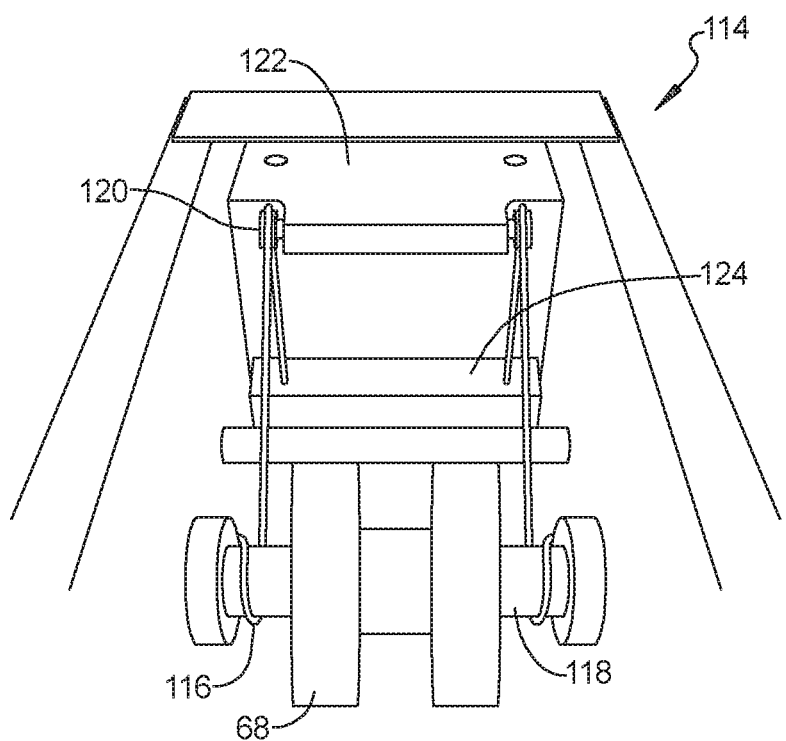
FIG. 14 is a top perspective partial cross-sectional view of the press of FIG. 1 showing a counterweight system connected to a cam.

Referring to FIG. 14 and again to FIGS. 1 through 12, the press 12 of the wire forming press apparatus 10 may further include a counterweight system 114. The counterweight system 114 includes a flexible belt 116 frictionally contacting one or more outer surfaces 118 of the first cam 68 and led via at least one pulley 120 rotatably connected to a follower 122 to a counterweight 124. The counterweight 124 is positioned in the housing 60 and acts to lift the upper die 16 and thereby assists the operator in returning the upper die 16 after displacement in the first direction 24 back to a "home" position shown in reference to FIG. 1, ready for a next wire forming operation.

Referring to FIG. 15 and again to FIGS. 1 through 14, also located within the housing 60 is a second mechanical assembly 126 which provides a mechanical advantage during manual rotation of the second lever arm 26. The second lever arm 26 is connected to a lever arm shaft 128 within the housing 60. The lever arm shaft 128 rotates a third spur gear 130 shown and described in greater detail in reference to FIG. 16 which rotates a second cam shaft 132. A second cam 134 connected to and co-rotated with the second cam shaft 132 displaces a second connecting rod follower 136 horizontally from the position shown in FIG. 15 to horizontally displace the blade 58 to perform a horizontal or "XY" stroke when performing the second operation in the second direction 30. Similar to the first pin 72, the second connecting rod follower 136 is rotatably connected to the second cam 134 using a second pin 138.

Figure 15:
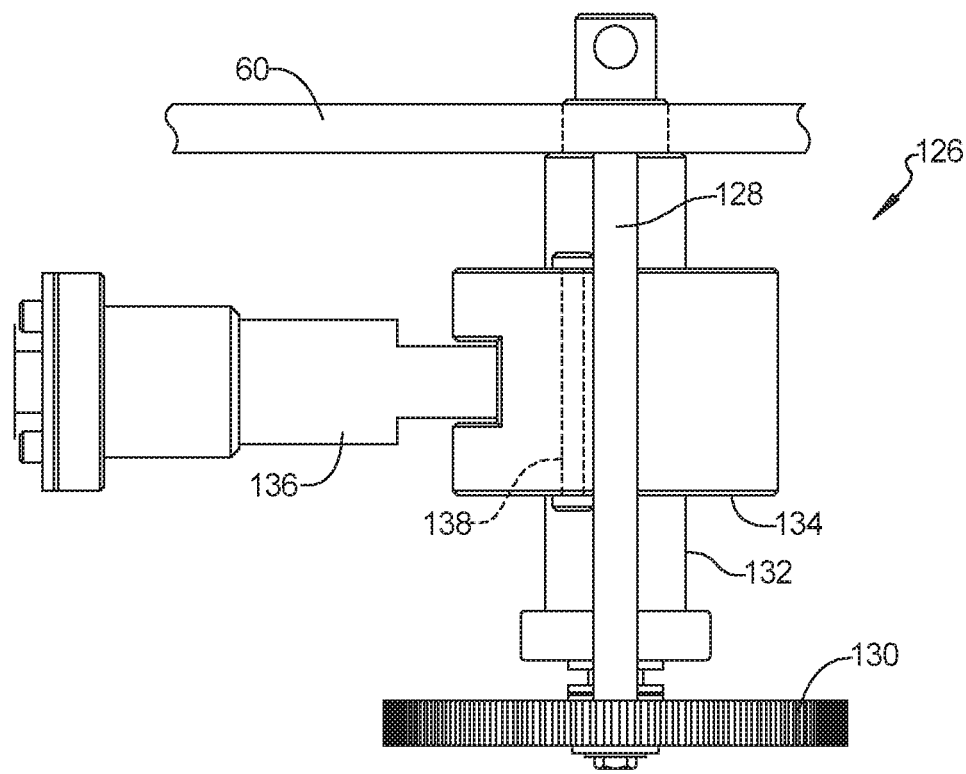
FIG. 15 is a partial cross-sectional top plan view of a second mechanical assembly within the press housing.

Referring to FIG. 16 and again to FIG. 15, the second mechanical assembly 126 includes a second gear set 140. The second gear set 140 is disposed within the housing 60 of the upper die 16 and provides the horizontal or "XY" stroke displacement for the blade 58 by manual rotation of the second lever arm 26. Manual rotation of the second lever arm 26 axially rotates the second lever arm shaft 128 to axially rotate the third gear 130 of the second gear set 140 which according to several aspects defines a spur gear fixed to the second lever arm shaft 128. The third gear 130 engages and rotates a fourth gear 142 of the second gear set 140 which according to several aspects defines a fourth spur gear which is fixedly mounted on the second cam shaft 132 and thereby axially rotates the second cam shaft 132 and the second cam 134. According to several aspects the third gear 130 has a third diameter d3 which is larger than a fourth diameter d4 of the fourth gear 142 to provide a mechanical advantage in rotating the second cam 134. A first end of the second connecting rod follower 136 is positioned within a cavity 144 of the second cam 134.

Figure 16:
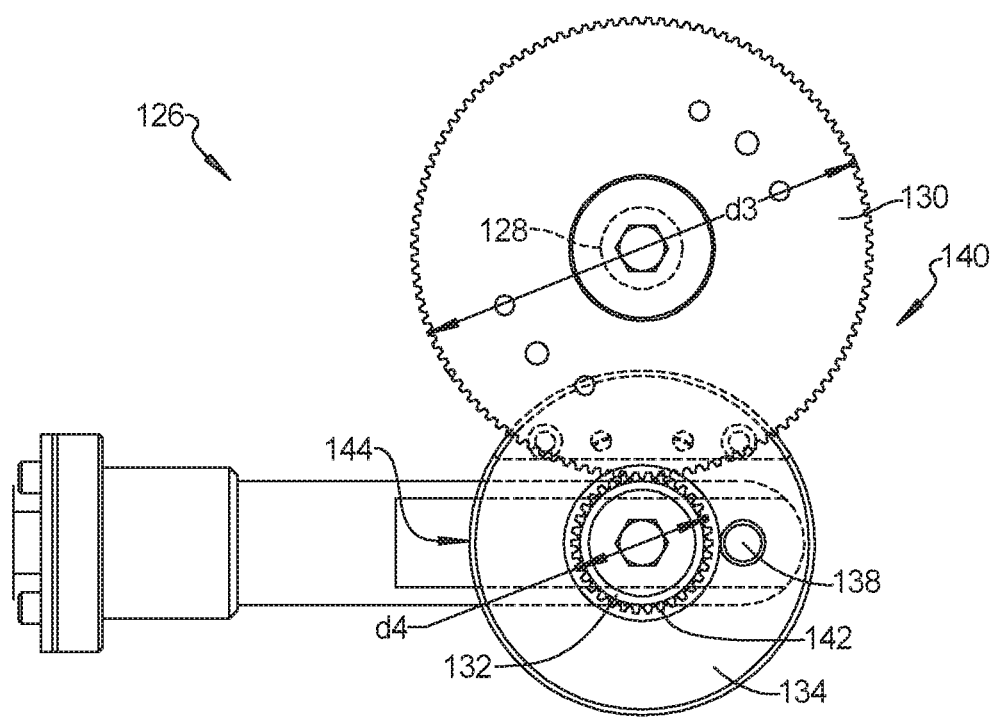
FIG. 16 is a side elevational view of the components of FIG. 15.
Figure 17:
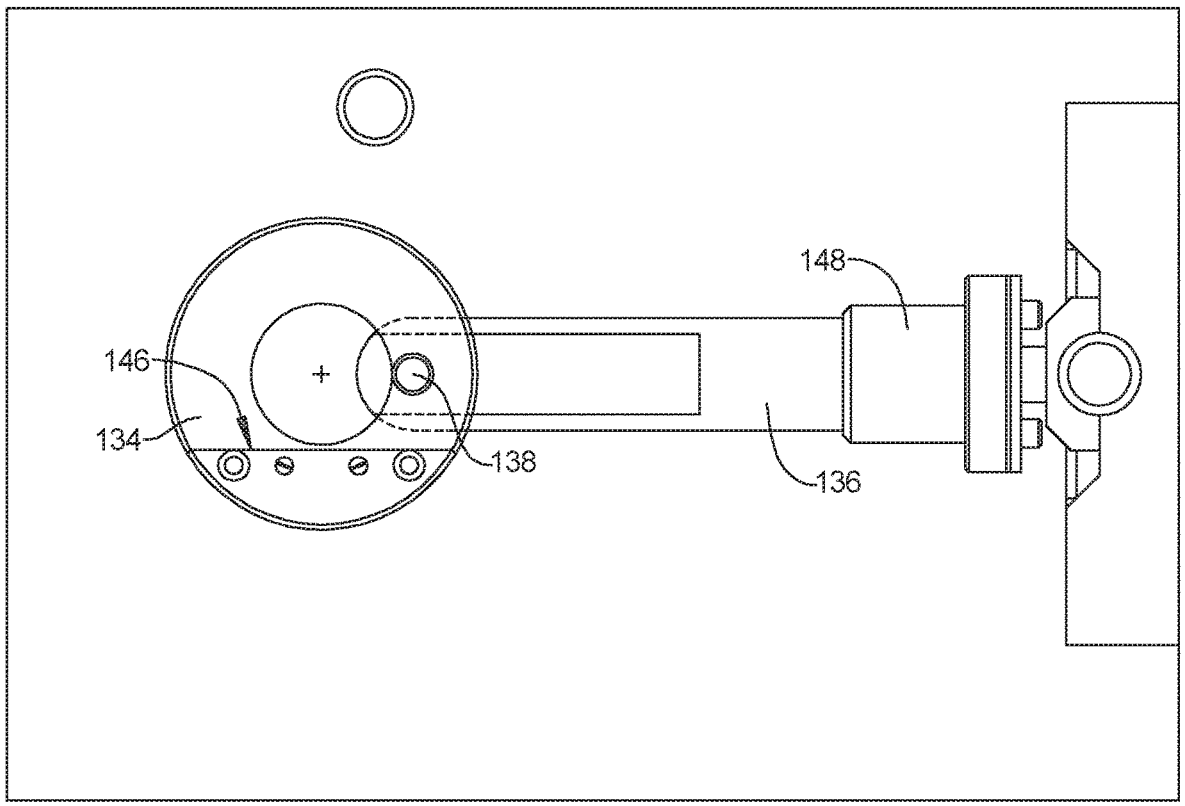
FIG. 17 is a rear elevational view of the second mechanical assembly components of FIG. 15.

Referring to FIG. 17 and again to FIGS. 15 and 16, the second cam 134 is provided with a positive rotation stop when the second connecting rod follower 136 directly contacts an inner wall 146 of the second cam 134. Similar to the adjustment device 88 an adjustment device 148 is positioned between the second connecting rod follower 136 and the upper die 16 allowing adjustment of a position of the blade 58. According to several aspects the adjustment device 148 defines a micrometer.

A wire forming press apparatus 10 of the present disclosure offers several advantages. The press 12 enables a low volume forming method that is capable of producing wires at quality levels equal to high volume production systems and with quick changeover. The device enables more efficient prototype wire forming by reducing cost and downtime while improving wire quality. The Manual ZXY Wire Forming Press 12 utilizes a gearing system for the first lever arm 20 and for the second lever arm 26 to allow for a smooth, low effort, and repeatable action in both the vertical and horizontal directions which results in a more repeatable wire form than traditional low volume wire forming techniques. The press 12 is also distinguished by the upper die 16 having tooling which is centered on an upper platen with four guide-posts for an even distribution of force and prevention of uneven wear. The tooling setup parameters are adjustable using positional values which are recorded and referenced by a wire form part number for quick changeover and setup. Setup is repeatable from tool to tool as tool position monitoring utilizes micrometer adjustments and variable readouts in lieu of manual measurements with a scale as would be required with existing devices. The wire forming press apparatus 10 is flexible as it is not limited by wire form geometry compared to semi-automatic and manual multi-step fixtures.

The gear driven dies with the inclusion of cam shafts enable the operator to complete the Z motion operation in a locked position. The locked position lifts the upper die 16 slightly (approximately 1.0 mm) after striking the wire form, reducing stress on the wire form during the subsequent horizontal XY motion second operation. The gearing also allows for a smoother motion and lower input force by the operator. Built in positional adjustments allow the operator to monitor and quickly detect if process parameters have shifted. Counterweights are also used to assist the operator by reducing the force to return the upper die to a home position.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A wire forming press apparatus, comprising:
    a press having a die assembly including a displaceable first die moved with respect to a fixed second die;
    a first lever arm configured to be manually displaced to perform a first operation in a first direction on a wire blank positioned between the first die and the second die;
    a first gear set connected to and rotated by displacement of the first lever arm;
    a cam connected by a connecting rod follower to the first die, the first gear set also connected to the cam to rotate the cam during displacement of the first lever arm to thereby displace the first die; and
    a pin connecting the connecting rod follower to the cam, the pin allowing the cam to axially rotate 90 degrees to a rotated position, and to axially rotate greater than 90 degrees to an over-center positive rotation stop for the cam, wherein the cam includes an inner wall directly contacted by an outer wall of the connecting rod follower to provide the positive rotation stop for the cam.

2. The wire forming press apparatus of claim 1, further including a second lever arm configured to be manually displaced to perform a second operation in a second direction opposite to the first direction on the wire blank.

3. The wire forming press apparatus of claim 2, further including a second gear set connected to and rotated by displacement of the second lever arm.

4. The wire forming press apparatus of claim 1, wherein the first die is in direct contact with the second die at the rotated position of the cam having a centerline of the pin aligned with a longitudinal axis of the connecting rod follower.

5. The wire forming press apparatus of claim 1, further including a gap between the first die and the second die created at the over-center positive rotation stop for the cam with the first die displaced away from the second die and having a centerline of the pin angularly displaced with respect to a longitudinal axis of the connecting rod follower.

6. The wire forming press apparatus of claim 1, further including an adjustment device positioned between the connecting rod follower and the first die to adjust a position of the first die.

7. The wire forming press apparatus of claim 1, wherein the gear set includes a first gear and a second gear, the first gear having a first diameter larger than a second diameter of the second gear to provide a mechanical advantage in rotating the cam.

8. A wire forming press apparatus, comprising:
   a press having a die assembly including a displaceable upper die moved with respect to a fixed lower die;
   a first lever arm configured to be manually displaced to perform a first operation in a first direction on a wire blank positioned between the upper die and the lower die;
   a second lever arm configured to be manually displaced to perform a second operation in a second direction opposite to the first direction on the wire blank;
   a first gear set connected to and rotated by displacement of the first lever arm;
   a second gear set connected to and rotated by displacement of the second lever arm;
   a cam connected by a connecting rod follower to the upper die; and
   a counterweight system including a flexible belt frictionally contacting an outer surface of the cam and connected to a counterweight, the counterweight acting to lift the upper die to return the upper die after downward displacement back to a home position.

9. The wire forming press apparatus of claim 8, wherein the first gear set is also connected to the cam to rotate the cam during displacement of the first lever arm to thereby displace the upper die.

10. The wire forming press apparatus of claim 9, further including:
    a lever arm shaft within a housing of the press;
    a first gear of the first gear set; and
    a cam shaft connected to the cam;
    wherein the first lever arm is connected to the lever arm shaft, the lever arm shaft rotating the first gear of the first gear set to rotate the cam shaft connected to the cam.

11. The wire forming press apparatus of claim 10, further including a pin connecting the connecting rod follower to the cam, the pin allowing the cam to axially rotate 90 degrees to a rotated position, and to axially rotate greater than 90 degrees to an over-center positive rotation stop for the cam wherein the cam corotated with the cam shaft to displace the connecting rod follower downwardly to downwardly displace the upper die toward the lower die.

12. The wire forming press apparatus of claim 8, wherein an apex is formed in the wire blank during the first operation performed in the first direction on the wire blank, the apex extending from and positioned between a first elevated shoulder and a second elevated shoulder.

13. The wire forming press apparatus of claim 8, further including an adjustment device positioned between the connecting rod follower and the upper die to adjust a position of the upper die, the adjustment device defining a micrometer.

14. A method for forming wire from wire blanks using a wire forming press apparatus, comprising:
    configuring a displaceable upper die with respect to a fixed lower die to create a die assembly;
    manually displacing a first lever arm to perform a first operation in a first direction on a wire blank positioned between the upper die and the lower die;
    rotating a first gear set connected to the upper die to assist displacing the first lever arm; and
    connecting a cam to the upper die using a connecting rod follower,
    wherein a pin connects the connecting rod follower to the cam, the pin configured to allow the cam to axially rotate 90 degrees to a rotated position, and to axially rotate greater than 90 degrees to an over-center positive rotation stop for the cam,
    wherein the cam includes an inner wall directly contacted by an outer wall of the connecting rod follower to provide the positive rotation stop for the cam.

15. The method for forming wire from wire blanks using a wire forming press apparatus of claim 14, further including:
    axially rotating the cam greater than 90 degrees to an over-center positive rotation stop for the cam; and
    manually moving a second lever arm to perform a second operation in a second direction opposite to the first direction on the wire blank.

16. The method for forming wire from wire blanks using a wire forming press apparatus of claim 15, further including engaging a second gear set by movement of the second lever arm to assist displacing the second lever arm.

* * * * *